United States Patent [19]

Bither et al.

[11] Patent Number: 5,544,330
[45] Date of Patent: Aug. 6, 1996

[54] FAULT TOLERANT INTERCONNECT TOPOLOGY USING MULTIPLE RINGS

[75] Inventors: David S. Bither, Littleton; Charles S. F. Loewy; Paul C. Wilson, both of Upton, all of Mass.

[73] Assignee: EMC Corporation, Hopkinton, Mass.

[21] Appl. No.: 275,005

[22] Filed: Jul. 13, 1994

[51] Int. Cl.⁶ .................................................. G06F 13/00
[52] U.S. Cl. ........................ 395/280; 395/200.21
[58] Field of Search ................................ 395/325, 280, 395/200.25

[56] References Cited

U.S. PATENT DOCUMENTS

| | | | |
|---|---|---|---|
| 3,641,505 | 2/1972 | Artz et al. | 340/172.5 |
| 4,032,893 | 6/1977 | Moran | 340/166 R |
| 4,112,488 | 9/1978 | Smith, III | 364/200 |
| 4,434,463 | 2/1984 | Quinquis et al. | 364/200 |
| 4,539,652 | 9/1985 | Rubin | 364/900 |
| 4,562,436 | 12/1985 | Coleman et al. | 340/825 |
| 4,630,193 | 12/1986 | Kris | 364/200 |
| 4,636,939 | 1/1987 | Fildes | 364/200 |
| 4,734,909 | 3/1988 | Bennett et al. | 370/85 |
| 4,805,091 | 2/1989 | Thiel et al. | 364/200 |
| 4,825,438 | 4/1989 | Bennett et al. | 371/8 |
| 4,922,486 | 5/1990 | Lidinsky et al. | 370/60 |
| 4,933,936 | 6/1990 | Rasmussen et al. | 370/85.3 |
| 4,942,517 | 7/1990 | Cok | 364/200 |
| 4,985,830 | 1/1991 | Atac et al. | 364/200 |
| 5,088,091 | 2/1992 | Schroeder et al. | 370/94.3 |
| 5,089,954 | 2/1992 | Rago | 395/600 |
| 5,138,615 | 8/1992 | Lamport et al. | 370/94.3 |
| 5,170,482 | 12/1992 | Shu et al. | 395/800 |
| 5,179,552 | 1/1993 | Chao | 370/60 |
| 5,197,130 | 3/1993 | Chen et al. | 395/325 |
| 5,210,871 | 5/1993 | Lala et al. | 395/650 |
| 5,243,704 | 9/1993 | Baty et al. | 395/325 |
| 5,271,014 | 12/1993 | Bruck et al. | 371/11.1 |
| 5,392,130 | 2/1995 | Mahoney | 358/400 |

OTHER PUBLICATIONS

National Semiconductor, QR0001 Specification, Nov. 2, 1993, pp. 1–43.

Primary Examiner—Jack B. Harvey
Assistant Examiner—John Travis
Attorney, Agent, or Firm—Weingarten, Schurgin, Gagnebin & Hayes

[57] ABSTRACT

An interconnect topology providing enhanced fault tolerance to a multi-component data processing system. The topology utilizes a plurality of rings for interconnecting multiple system components, or cards, at least two of which are indirectly connected so that communication therebetween is through a third component. Each of the system components is coupled to a set of at least two different rings and includes interface circuits for routing data and a bridge for permitting data to be transferred between the at least two rings.

25 Claims, 8 Drawing Sheets

FAULT TOLERANT INTERCONNECT TOPOLOGY USING MULTIPLE RINGS

FIELD OF THE INVENTION

This invention relates generally to interconnection topologies and more particularly, to an interconnect topology providing enhanced fault tolerance to a multi-component data processing system.

BACKGROUND OF THE INVENTION

Data processing systems which operate in a stand alone manner or as one of a plurality of nodes in a computer network are known. Illustrative types of such systems are computers such as workstations, mainframes, and minicomputers, etc. The interconnection of the components, or cards, within such a system is typically achieved via a linear data bus architecture.

Fault tolerant systems are advantageous since such systems may be able to continue to operate even in the event of a fault and/or following removal of a system component. Preferably, the interconnection topology provides a level of fault tolerance which permits the data processing system to continue operation in the event of one or more faults or in the event of removal of one or more components.

Various schemes are utilized to interconnect the components of a data processing system to achieve some level of fault tolerance. One such scheme utilizes parallel redundant linear data buses to interconnect the system components, either with each component connected to each of the parallel buses or with selected components, such as disk controllers, connected to both buses and other components, such as processors, coupled to only one of the buses. The feasibility of this scheme may be limited due to the area necessary for the additional pins and drivers to connect to the redundant bus. Moreover, since some of the system components are coupled to both of the buses, a fault associated with such a component can interrupt service on both of the buses, thereby halting operation of the entire system.

Another fault tolerant interconnection arrangement, providing at least partial fault tolerance for use with ring interconnected networks, utilizes "bus wrapping" hardware for bypassing a disabled system component. More particularly, each of the components includes hardware for permitting data to be transmitted therethrough in the event of a failure of circuitry associated with the component, thereby enabling the other components on the ring to maintain communication. Use of such "bus wrapping" hardware disadvantageously increases the cost of the system components.

SUMMARY OF THE INVENTION

In accordance with the invention, a multi-component data processing system utilizes a novel interconnect topology to provide enhanced fault tolerance. A plurality of data transmission rings interconnect the multiple system components, or cards, with each component coupled to every other component either directly on a single ring or indirectly through one or more of the system components over plural rings. The use of multiple component interconnect rings is advantageous due to the increased bandwidth resulting from the ability to permit multiple simultaneous data transfers. Moreover, the use of multiple rings enables each ring to be shorter than otherwise necessary.

At least two of the system components are indirectly connected, such that data transferred therebetween is transferred through a third component. This arrangement is advantageous since loading of the rings is reduced and complexity is avoided, as compared to systems in which each component is directly connected to every other component.

Each of the system components is coupled to a different set of at least two of the rings. With this arrangement, a component failure which causes a ring to be broken does not cause the isolation of the other components on the same ring, because access to the other components on the ring is still available via the non-broken one of the at least two rings to which such other component is connected. In one embodiment, each component is connected to two different rings, thereby achieving the benefit of fault tolerance without disadvantageously increasing the number or rings.

More particularly, each of the system components interconnected in accordance with the invention includes a bridge which permits data to be transferred across the component on the same ring or alteratively, between the at least two rings to which the component is connected. In this way, the bridge permits indirect coupling of the circuit components without sacrificing fault tolerance. That is, bridging data between rings permits data transmission between components that are not directly connected to a common ring. Moreover, components that are normally directly connected to a common ring may become indirectly connected in the event of a failure of another component on the common ring. In this case, the two components can still communicate by bridging data across one or more other components.

In one embodiment, each of the circuit components includes QuickRing™ interface circuits for interfacing between a processor associated with the respective component and the pair of rings to which the respective component is connected. The QuickRing™ interface circuits permit data transmission on the interconnect rings at a rate of at least 200 MBps. Each of the components further includes a bridge for permitting communication between the pair of rings to which the respective component is connected. The components are interconnected such that each component can communicate with every other component, either directly (i.e., by being connected to a common ring) or indirectly (i.e., by data "hopping" through one or more other components via a bridge).

With this arrangement, if one of the components is removed or experiences a failure, the other components on the broken ring can still communicate with each other. Moreover, certain two-point failures (i.e., a failure or removal of two components or a combination of both) may be withstood without isolating any of the operable components. Thus, an improved interconnect scheme for the components of a data processing system is provided with enhanced fault tolerance.

BRIEF DESCRIPTION OF THE DRAWINGS

The foregoing features of this invention may be more fully understood from the following detailed description of the invention in which.

DESCRIPTION OF THE PREFERRED EMBODIMENT

Figure 1:
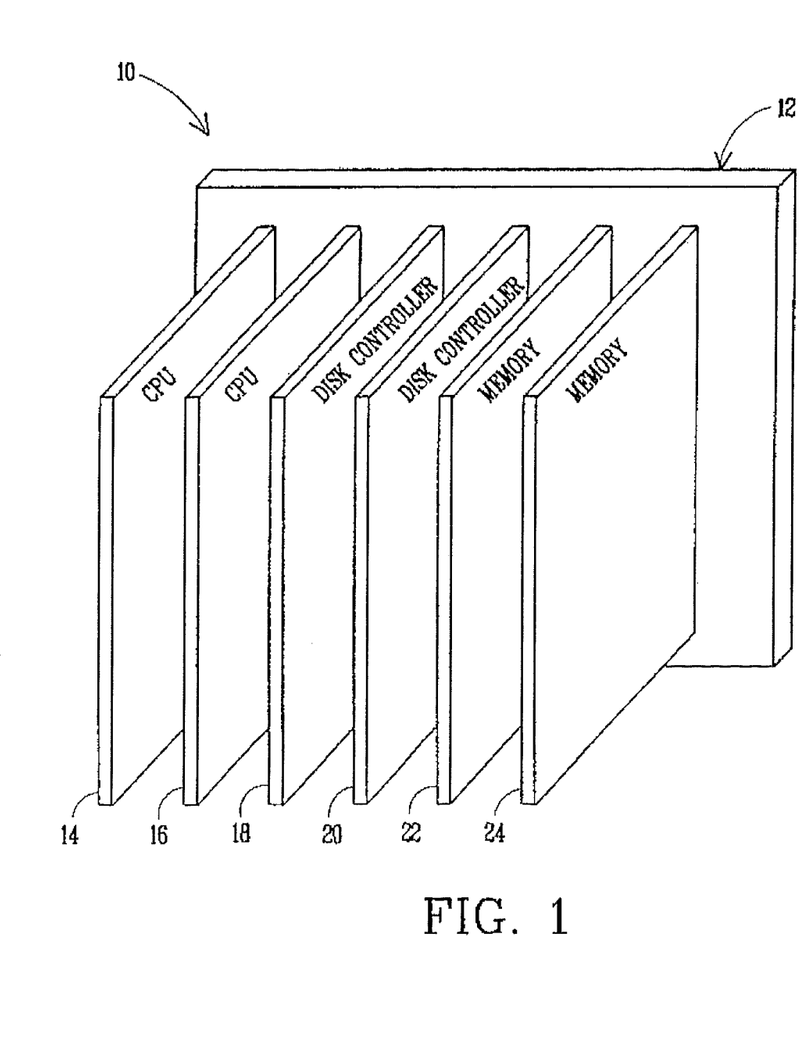
FIG. 1 is a diagram of an illustrative data processing system comprising multiple computer components connected to a backplane.

Referring to FIG. 1, a data processing system 10 is shown to include a backplane 12 to which a plurality of system components, or cards 14–24 are connected via corresponding connectors (not shown). Conductive traces on the backplane 12 interconnect the components 14–24 and thus, also electronic circuitry thereon, as is conventional.

Figure 8:
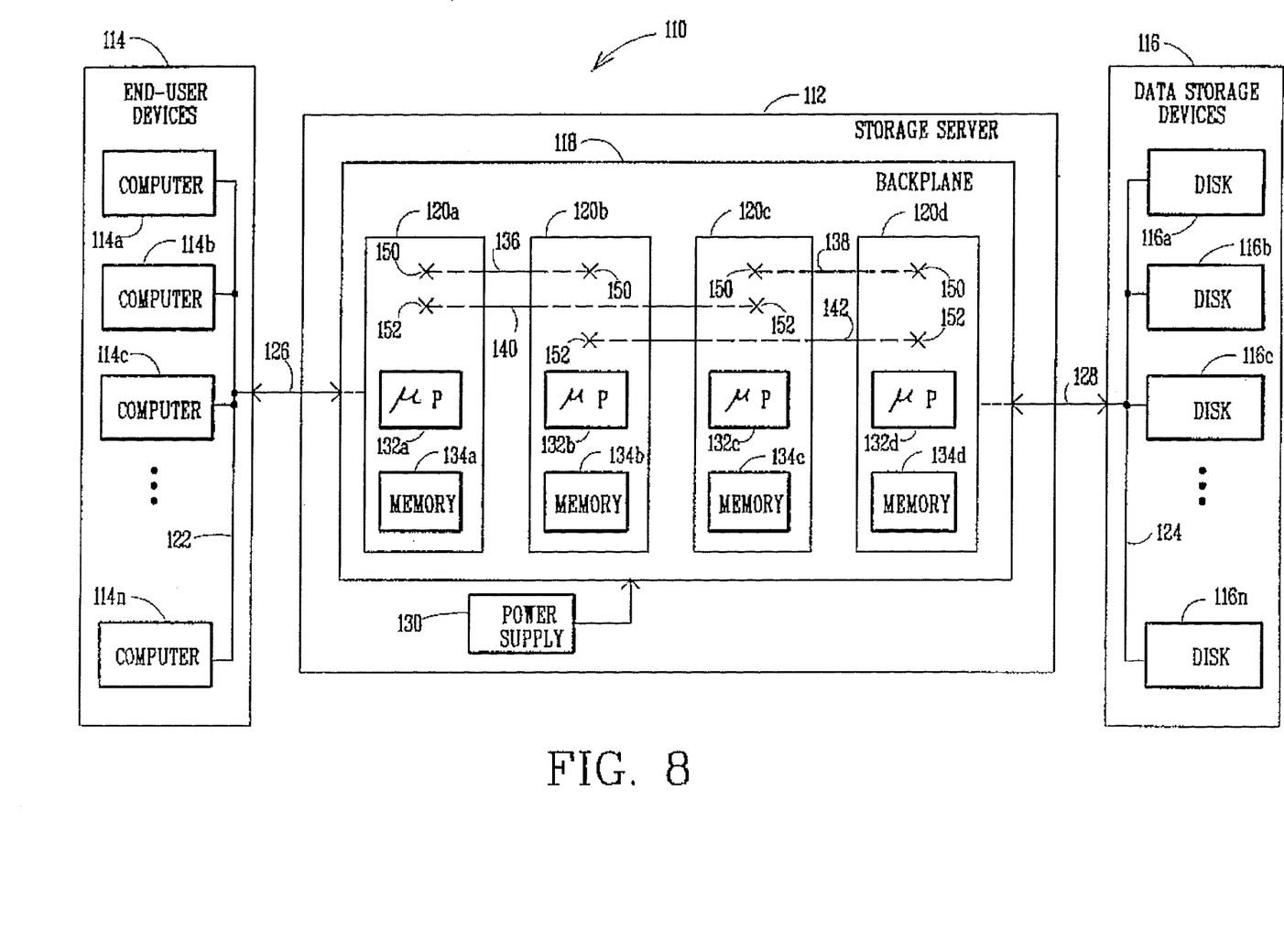
FIG. 8 is a diagram of a computer network data processing system including a storage server utilizing the interconnect topology of the present invention.

In the illustrative data processing system 10 of FIG. 1, components 14 and 16 are central processor unit (CPU) boards, components 18 and 20 are disk controller boards and components 22 and 24 are memory boards. It will be appreciated however, that the present interconnect topology is suitable for interconnecting various types and combinations of data processing components comprising a data processing system. For example, the interconnected system components may be of the same type, such as the interconnection of a plurality of disk controller boards as shown in the embodiment of FIG. 8 or the interconnection of different types of system components, such as CPU boards, memory boards, and/or disk controller boards as shown in FIG. 1. The data processing system 10 of FIG. 1 may be a stand alone unit or alternatively, may constitute a node of a larger computer network.

It will also be appreciated that the number of interconnected components can be readily varied in accordance with a particular application, while still practicing the interconnect topology of the present invention and obtaining the advantages thereof. The number of system components interconnected in accordance with the invention will depend on such considerations as user requirements, available space, and cost.

Figure 2:
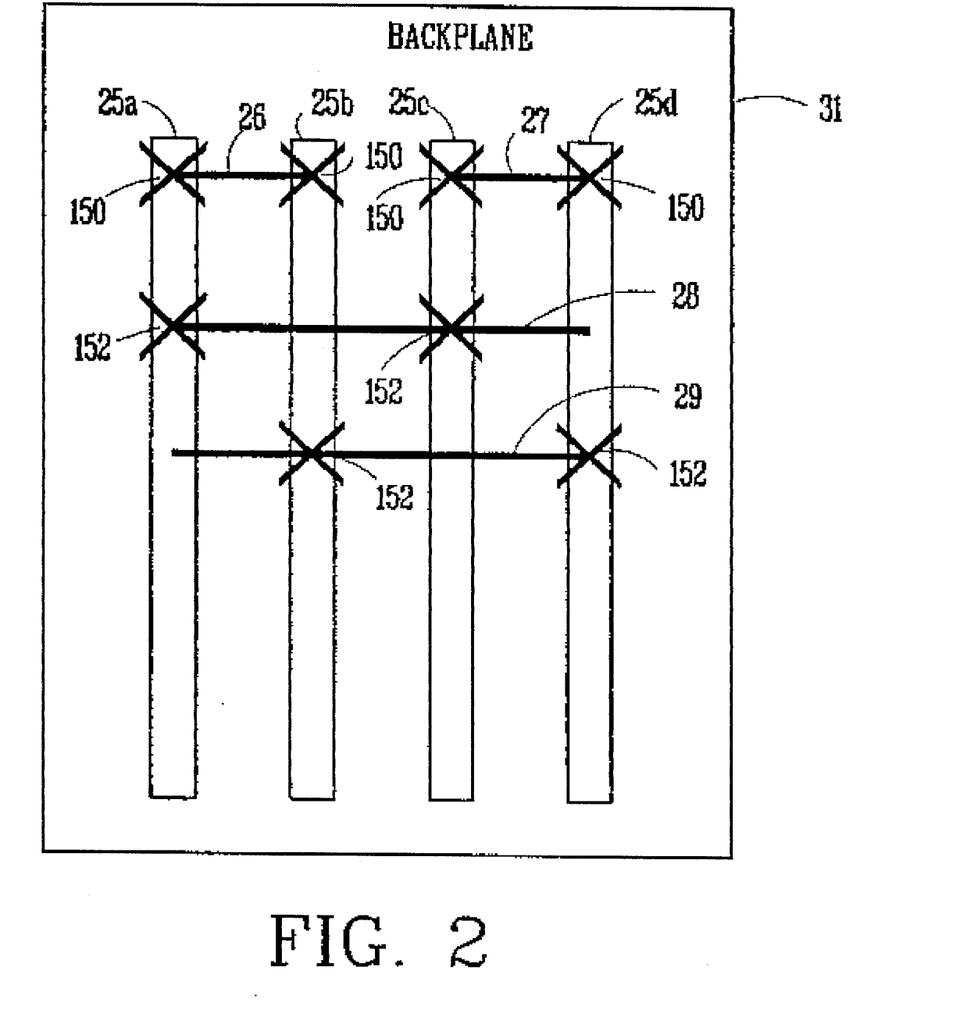
FIG. 2 is a diagram of the interconnect topology of the present invention for use in interconnecting four system components.

Referring to FIG. 2, a diagram of illustrative system components 25a–d interconnected in accordance with the invention is shown. Each of the components 25a–d comprises one of the types of components shown in FIG. 1. Alternatively however, the components 25a–d may comprise any other type of system component for use with a data processing system. Components 25a–d are connected to a backplane 31 for interconnection via conductive traces.

More particularly, ring-like data buses, or rings 26–29 interconnect the components 25a–d in a manner that provides enhanced fault tolerance. The rings 26–29 provide unidirectional communication paths for signal transmission. Although the rings 26–29 are shown diagrammatically in FIGS. 2 and 5–8 as linear buses, or communication paths, each such ring 26–29 is in fact shaped like a ring, or loop, as is shown and described below in conjunction with FIG. 3.

Each of the components 25a–d is coupled to a different set of the rings 26–29, and specifically to two different rings, via ports 150, 152. With this arrangement, if a fault occurs on one of the components 25a–d which makes communication over one of the rings impossible, none of the other components on the broken ring will be isolated and unable to communicate with the rest of the system because each of the other components on the broken ring can be accessed via the non-broken ring to which such other component is connected.

Use of multiple rings 26–29 for component interconnection is advantageous due to the increased bandwidth potential. That is, multiple rings enable multiple simultaneous data transfers on different rings, thereby increasing the aggregate bandwidth. Moreover, the use of multiple rings permits each ring to be relatively short.

Preferably, at least two of the components 25a–d are indirectly connected (i.e., are not connected to a common ring) so that data transferred therebetween is transferred through a third component. For example, in order to transfer data from component 25a to indirectly coupled component 25d, the data can be passed from component 25a to component 25b via ring 26 and then from component 25b to component 25d via ring 29. Alternatively, such data can be transferred from component 25a to component 25c via ring 28 and then from component 25c to component 25d via ring 27. In this way, fewer direct connections are provided between the components 25a–d, resulting in lighter loading of the rings 26–29, without sacrificing component communication capability.

Each ring be coupled to at least two of the components 25a–d in order to avoid isolating a ring in the event of a failure of one of the components 25a–d. In the embodiment of FIG. 2, each of the four rings 26–29 is coupled to two of the components 25a–d. More generally however, each of the rings 26–29 is coupled to two or more components 25a–d. The maximum number of components connected to a single ring is governed by the acceptable loading on the particular ring without causing impermissible data degradation. It has been found that an advantageous number of components connected to each ring is the square root of the total number of components in the data processing system.

Figure 3:
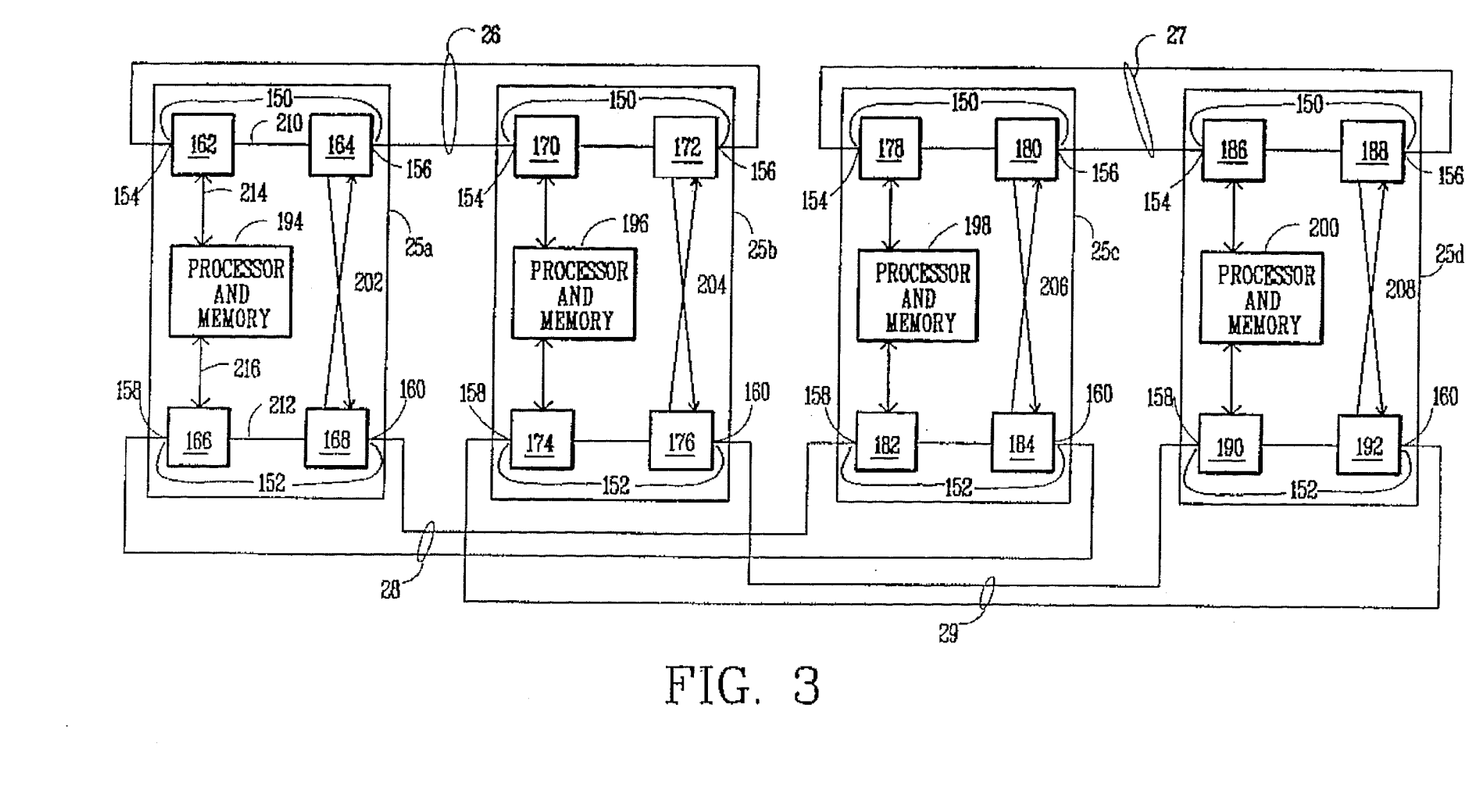
FIG. 3 is a more detailed diagram of the components of FIG. 2 interconnected in accordance with the present invention.

Referring to FIG. 3, the components 25a–d are shown in greater detail. Each of the ports 150, 152 of the components 25a–d includes a pair of terminals 154, 156 and 158, 160, respectively. A first one of the terminals 154, 158 associated with each port 150, 152 is an input port to the component from a ring and a second terminal 156, 160 of the ports 150, 152 is an output port from the component to a ring.

Each of the components 25a–d includes a processor and memory unit 194–200, respectively. Also provided on each of the components 25a–d are four interface circuits 162–192, each one associated with a different one of the component terminals 154–160, as shown. Considering exemplary component 25a, processor interface circuits 162, 166 are coupled to terminals 154, 158 for receiving and processing data, whereas bridge interface circuits 164, 168 are coupled to terminals 156, 160 for receiving and processing data. More particularly, the interface circuits 162–168 of exemplary component 25a are arranged for serial communication between each pair of terminals 154, 156 and 158, 160 via signal lines 210, 212, respectively, as shown.

In a preferred embodiment, each of the interface circuits 162–192 is a QuickRing™ interface circuit QR0001, manufactured by National Semiconductor, and described in a "QR0001 Specification" dated Nov. 2, 1993 and incorporated herein by reference. Each QuickRing™ interface circuit 162–192 re-formats received 32-bit data into a 42-bit packet including, in addition to the 32-bits of data, one frame bit, two control bits and seven bits of error detection code. Use of the QuickRing™ interface circuits permits data transmission on interconnect rings 26–29 at a rate of at least 200 MBps. When QuickRing™ interface circuits are used, preferably each ring is connected to no more than eight components.

Also provided on each component 25a–d is a bridge 202–208, respectively. Bridges 202–208 permit data transfer between the two rings to which the respective bridge is coupled. For example, the bridge 202 of exemplary component 25a is connected between the bridge interface circuit 164 associated with the terminal 156 of the first port 150 and the bridge interface circuit 168 associated with the terminal 160 of the second port 152 to permit communication between the two rings 136 and 140 to which the component 25a is coupled. Thus, the interface circuits 162–168 in conjunction with the bridge 202 permit serial data transmission through the exemplary component 25a as well as data transmission between the two rings 26, 28 to which the component is coupled. With this arrangement, indirect coupling of components is permitted, while still providing fault tolerance.

In operation, the processor interface circuits 162, 166 read the address associated with an incoming packet of data from rings 26, 28, respectively, to determine whether the address matches an address associated with the receiving component 25a. If the data addresses are determined to match, then the receiving interface circuit 162, 166 transmits the data to the processor and memory unit 194 associated with the receiving component 25a via the corresponding one of bi-directional signal lines 214, 216. If, alternatively, the data addresses do not match, then the data is serially transmitted to the corresponding bridge interface circuit 164, 168 via the corresponding one of signal lines 210, 212.

More particularly, in the case where the address of the incoming data does not match that associated with the receiving component 25a, the component to which the address corresponds is determined. If the data address is determined to correspond to a subsequent component connected to the same ring, then the data is serially transmitted along the ring to the processor interface circuit of the designated component. For example, if data received by interface circuit 162 has an address corresponding to component 25b, then the data is transmitted through bridge interface circuit 164 to processor interface circuit 170 of component 25b for further processing by processor and memory unit 196 of component 25b.

If, on the other hand, the address associated with incoming data is determined to correspond to a component connected to a different ring than the ring to which the receiving interface circuit is connected, then the data is bridged via one or more of the bridges 202–208 to the designated component. For example, if the address of data received by processor interface circuit 162 of component 25a corresponds to component 25d (which is not directly coupled to component 25a) then one or more bridges are utilized to transmit the data accordingly. Specifically, the data is transmitted by processor interface circuit 162 to bridge interface circuit 164 and across bridge 202 to bridge interface circuit 168 for transmission on ring 28 to component 25c. The data is thereafter transmitted from component 25c to component 25d via bridge 206 and ring 27. Specifically, the path of such data is from processor interface circuit 182 of component 25c, to bridge interface circuit 184, across bridge 206, to bridge interface circuit 180 and to processor interface circuit 186 for processing by component 25d.

The present interconnect topology is fault tolerant in that, if one of the components 25a–d is removed or fails or if a ring itself is opened, such as by a break in the backplane etch, thereby rendering communication over a ring impossible, none of the other components connected to the broken ring is isolated from the system. That is, each of the remaining components can be accessed from a ring that has not been affected. This arrangement thus, permits continued system operation (i.e., hot swap capability) in the event of a component fault.

More particularly, it is noted that two types of component "faults" can occur; one associated with removal from the backplane and one associated with the failure of one or more devices on the component. Note that a device failure often results in continued operation at a higher throughput capacity as compared to removal of a component, since the interface circuits 162–192 can still transmit data, even if other devices on the component fail. For example, if the processor and memory unit 194 of component 25a fails, then the rings 26 and 28 to which the component are connected are not broken since data can still be passed through interface circuits 162, 164 and 166, 168. In the worse case device failure, a component effectively removes itself and the two rings to which it is connected from operation, the same result as occurs when the component is removed from the system.

Data normally transmitted on a broken ring may require rerouting to achieve fault tolerant operation, as will be illustrated below in conjunction with FIG. 6. That is, data normally transmitted over one ring between components connected to a common ring or over two rings (i.e., with a "hop" across a third component) may require an additional "hop". In this way, the remainder of the components on the broken ring are able to maintain communication without interruption.

Figure 4:
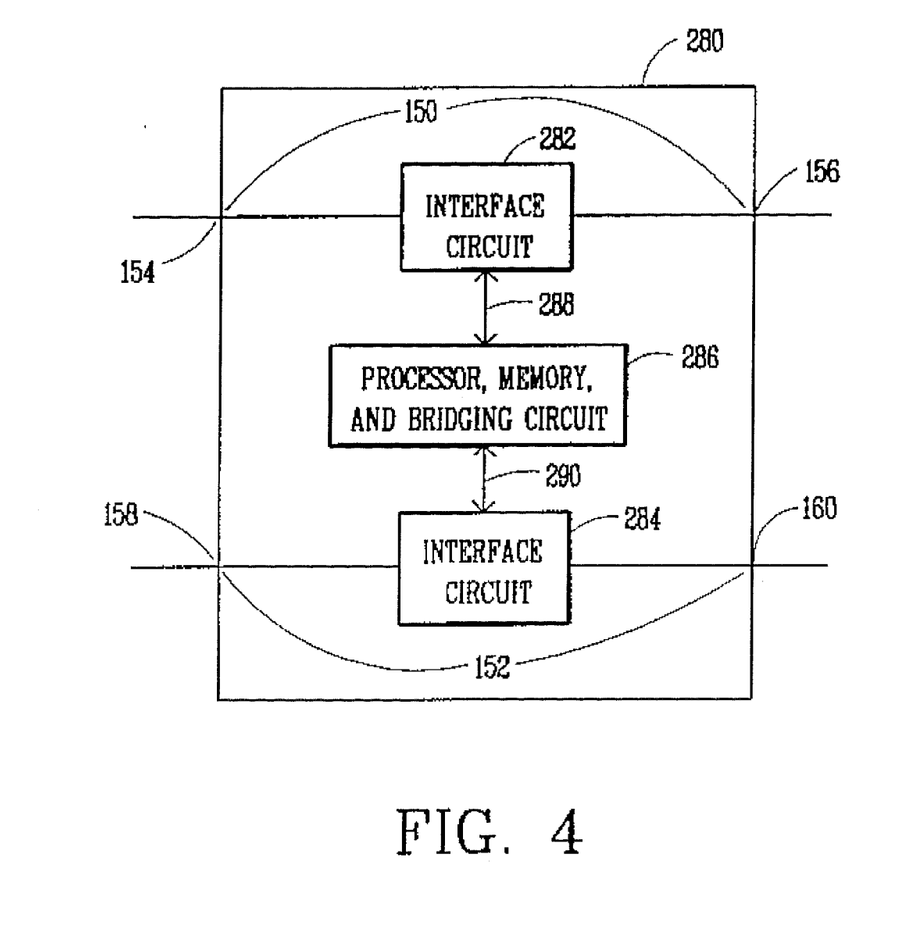
FIG. 4 is a diagram of an alternate embodiment of the components of FIG. 3.

Referring to FIG. 4 an alternate component embodiment of a system component 280 is shown to include two interface circuits 282, 284. Each of the interface circuits 282, 284 is associated with a different ring and thus, a different one of the ports 150, 152, as shown. The component 280 has internal circuitry including a processor, memory, and bridging circuit 286.

If data received by either one of the interface circuits 282, 284 has an address that corresponds to another component connected to the same ring, then the data is transmitted through the component 280 (i.e., from terminal 154 through interface circuit 282 to terminal 156 or from terminal 158 through interface circuit 284 and to terminal 160). If, on the other hand, the received data has an address matching either the address of the receiving component 280 or the address of a component on another ring, then the data is transmitted to the processor, memory, and bridging circuit 286 via the corresponding one of bi-directional signal lines 288, 290. More particularly, if the address corresponds to the address of the received component, then the data is processed by the processor portion of circuit 286. If the address corresponds to a component on another ring, then the data is reformatted and transmitted through the bridging portion of circuit 286 to the designated component.

Figure 5:
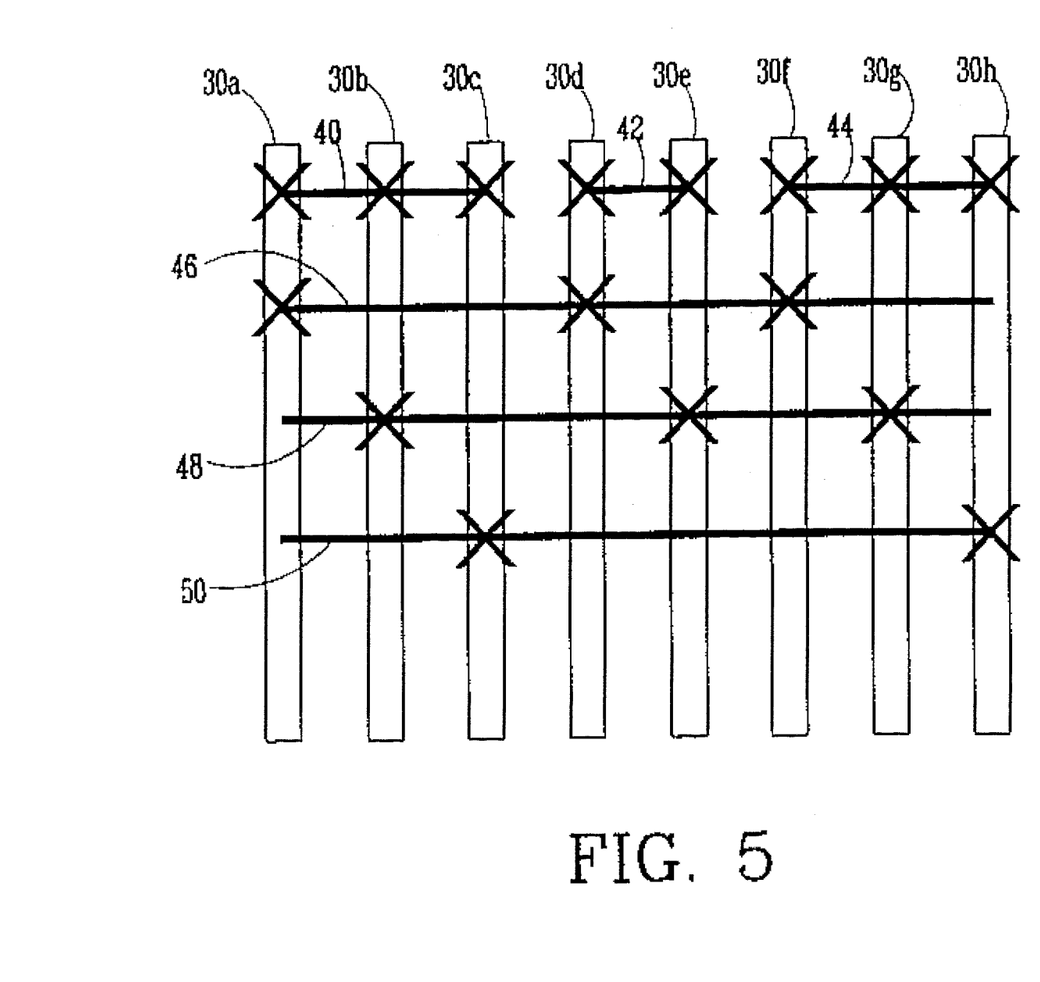
FIG. 5 is a diagram of the interconnect topology of the present invention for use in interconnecting eight system components.

Referring to FIG. 5, a diagram of the interconnect topology of the present invention is shown for use in interconnecting eight system components 30a–h. Preferably, each of the components 30a–h is identical to the components 25a–d of FIG. 3 utilizing QuickRing™ interconnect circuits. The system of FIG. 5 includes six rings 40–50 for interconnecting the components 30a–h, as shown.

The system components 30a–h shown in FIG. 5 are interconnected by rings 40–50 in the same manner as discussed above in conjunction with the four interconnected components 25a–d of FIGS. 2–3. More particularly, each of the components 30a–h is connected to every other component for communication, with at least two of the components, 30a, 30e for example, being indirectly coupled so that communication therebetween is via a third component, 30d for example. In this way, the multiple rings 40–50 are not overloaded (as might occur if each component 30a–h were directly coupled to every other component).

Each of the components 30a–h is coupled to a different set of at least two rings. In the illustrative embodiment of FIG. 5, each component 30a–h is coupled to a different set of two rings. Each of the rings 40–50 is coupled to either two or three of the components 30a–h, as shown. It is noted however that the rings 40–50 may alternatively be coupled to more than two components 30a–h and preferably to no more than eight components, as mentioned above.

Figure 6:
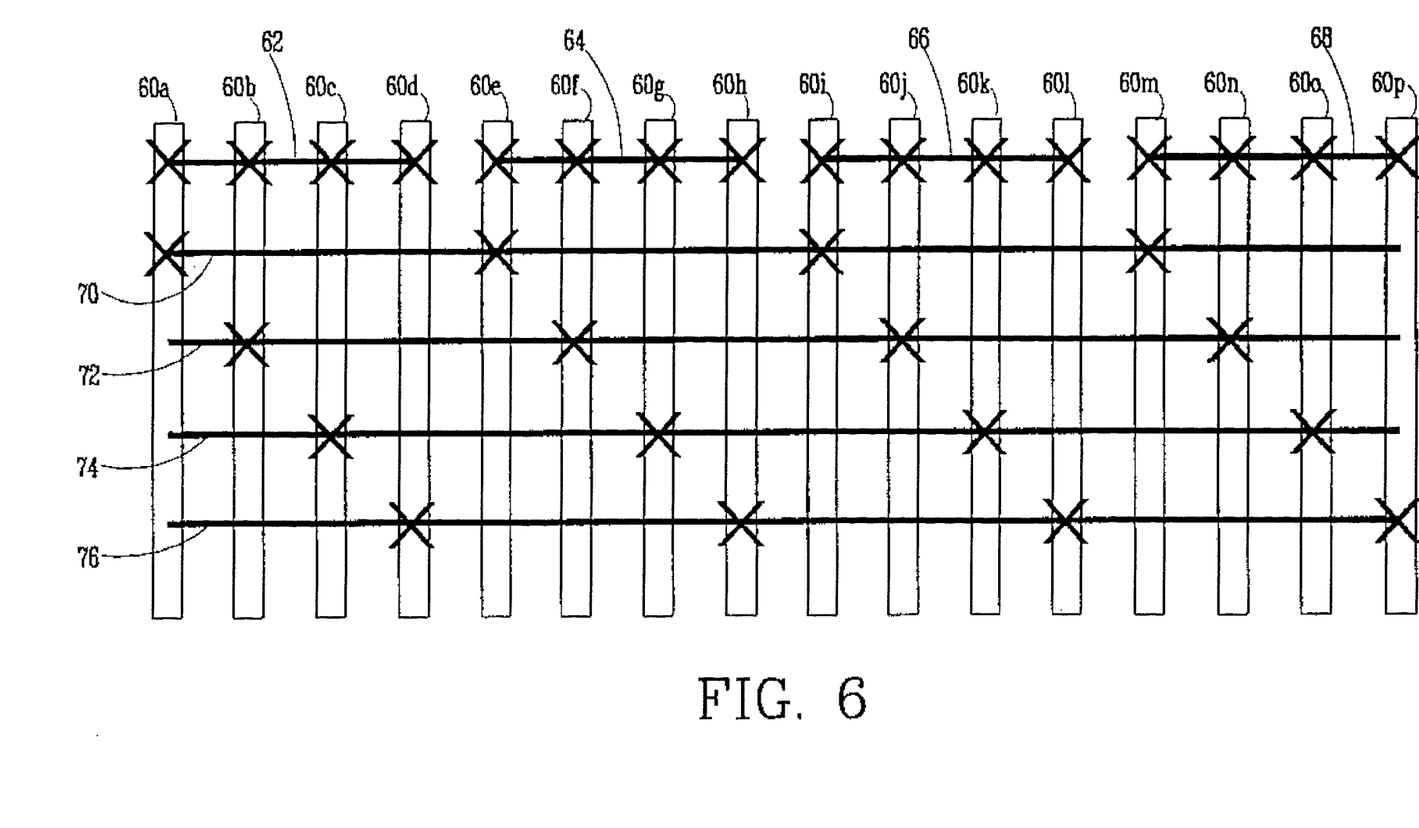
FIG. 6 is a diagram of the interconnect topology of the present invention for use in interconnecting sixteen system components.

Referring to FIG. 6, the interconnect topology of the present invention is shown for use in interconnecting sixteen system components 60a–p. Preferably, each of the components 60a–p is identical to the components 25a–d shown in FIG. 3 utilizing QuickRing™ interconnect circuits. Eight rings 62–76 interconnect the plurality of components 60a–p, as shown.

In the manner previously described, each of the components 60a–p is connected to every other component either directly or indirectly. At least two of the components, 60a, 60f for example, are indirectly coupled such that communication therebetween requires transmittal of the data through a third component (i.e., "hopping"), 60e for example. As mentioned, use of indirect coupling between components minimizes loading of the rings, as compared to each component being directly coupled to every other component. Each of the components 60a–h is coupled to a different set of at least two rings, with each ring 62–76 likewise being coupled to at least two components 60a–p and preferably to no more than eight components. In the embodiment of FIG. 6, each ring is connected to four components, as shown. In order to illustrate the fault tolerance of the interconnect topology described herein, consider "normal" data routing between component 60e and 60h. Since such components are directly coupled, "normal" communication therebetween is via common ring 64.

If one of the other components 60f, 60g on the same ring 64 fails or is removed, then the data transmission between components 60e, 60h is re-routed in order to maintain communication. For example, consider the case where component 60f is removed. The data transmitted from component 60e to 60h is then re-routed. One possible re-routing path is from component 60e to component 60i via ring 70, from component 60i to component 60l via ring 66, and from component 60l to component 60h via ring 76. Thus, it is apparent that, in the event of a failure on component 60f, data communication between components 60e and 60h requires two "hops".

The fault tolerance of the present interconnect scheme is enhanced in that, in certain instances, continued system operation is permitted even where more than one failure occurs. For example, if any of components 60b, 60e, 60g, 60h, 60j, or 60n are removed in addition to component 60f, then the data processing system will not be completely shut down. Although performance will be somewhat degraded (i.e., in terms of increasing the requisite number of "hops" necessary for certain data transmissions), none of the operable components will be isolated from the system. Thus, it is apparent that a data processing system utilizing the present interconnection topology is able to withstand many two-point failures or component removals without halting operation of the entire system.

Figure 7:
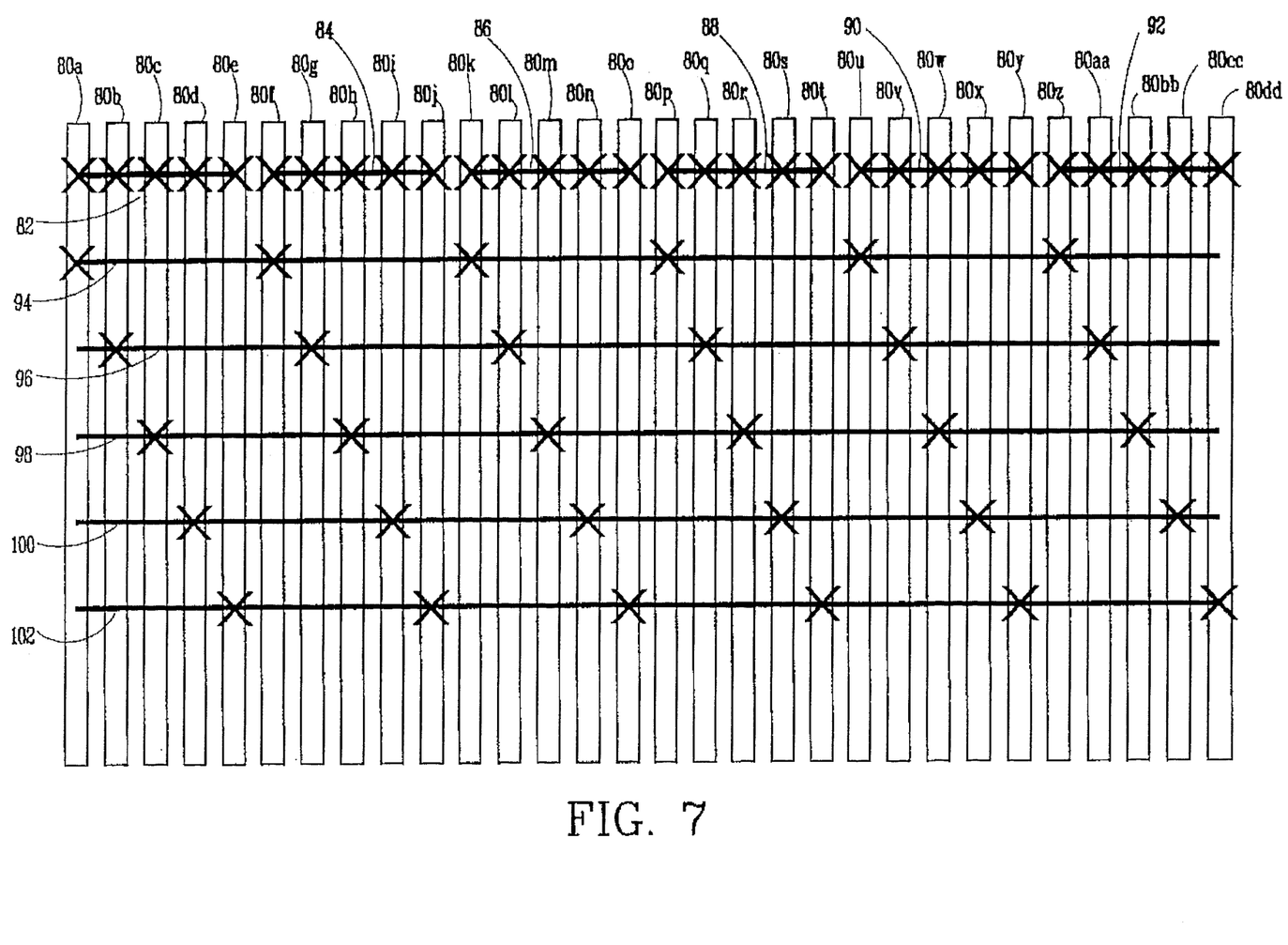
FIG. 7 is a diagram of the interconnect topology of the present invention for use in interconnecting thirty system components.

Referring to FIG. 7, a diagram of thirty components interconnected in the manner of the present invention is shown. More particularly, the thirty components 80a–dd are interconnected by a plurality of rings 82–102, with at least two of the components indirectly connected via a third component. In the embodiment of FIG. 7, each of the rings 82–102 is connected to five components. Preferably, each of the components 80a–80dd utilizes QuickRing™ interconnect circuits described above in conjunction with components 25a–d of FIG. 3. With this arrangement, the fault tolerant benefits described above are realized in the thirty component data processing system of FIG. 7.

Referring to FIG. 8, a data processing system 110 is shown to include a storage server 112 coupled between end-user devices 114 and data storage devices 116. The storage server 112 includes a backplane 118 having multiple disk controller boards, or controllers 120a–d connected thereto and interconnected in accordance with the topology of the present invention.

The end user devices 114 may comprise various types of computers 114a–n, such as workstations, adapted for networked data communication. The computers 114a–n are interconnected by a network 122 of a conventional type. The data storage devices 116 comprise multiple disk drives 116a–n, a plurality of which are preferably redundant. The disk drives 116a–n are interconnected by a network 124 of a conventional type.

The storage server 112 controls communication of the computers 114a–n with the data storage devices 116. To this end, the storage server 112 is coupled to both the end-user devices 114 via a bidirectional bus 126 and to the data storage devices 116 via a bidirectional bus 128. With this arrangement, the computers 114a–n can be physically spaced apart for user convenience, while still having the ability to access the centralized storage devices 116. For example, the data storage devices 116 may be housed in a centrally located card cage in proximity to a card cage housing the storage server 112, whereas the computers 114a–n are decentrally located throughout a user facility.

Each of the disk controllers 120a–d includes a processor 132a–d and a memory device 134a–d, respectively. The controllers 120a–d are connected to the backplane 118 via conventional pin connectors and are interconnected via conductive traces on the backplane. A conventional power supply 130 is coupled to the backplane 118 for providing power to the controllers 120a–d.

Rings 136–142 interconnect the controllers 120a–d in accordance with the invention to provide enhanced fault tolerance to the system 110, as described above in conjunction with FIGS. 2–3. To this end, each of the controllers 120a–d is coupled to a different set of the rings 136–142, and specifically to two different rings. With this arrangement, if a fault occurs on one of the controllers 120a–d or if one of the controllers is removed, thereby breaking a ring, none of the other components on the broken ring is isolated and unable to communicate with the rest of the system. This is because each of the other components on the broken ring can be accessed via the non-broken ring to which it is connected.

At least one of the rings 136–142 is coupled to the buses 126, 128 to permit entire system communication.

Preferably, at least two of the controllers 120a–d are indirectly connected (i.e., are not connected to a common ring) so that data transferred therebetween is transferred through a third controller. In this way, fewer direct connections are provided between the controllers 120a–d, resulting in lighter loading of the rings 136–142.

Each ring be coupled to at least two of the controllers 120a–d in order to avoid isolating a ring from the system 110 in the event of a failure of one of the controllers 120a–d. In the embodiment of FIG. 8, each of the four rings 136–142 is coupled to two of the controllers 120a–d. However, generally the rings 136–142 may be coupled to more than two controllers 120a–d. The maximum number of controllers connected to a single ring is governed by the loading on the ring which is acceptable without signal degradation. As noted, it is preferable that none of the rings be connected to more than eight controllers.

Having described preferred embodiments of the invention, it will be apparent to one of skill in the art that other embodiments incorporating the novel concepts may be employed. Accordingly, the invention should be limited only by the spirit and scope of the appended claims.

We claim:

1. A data processing system comprising:

a plurality of system components; and a plurality of unidirectional transmission rings interconnecting said plurality of system components, each of said plurality of system components being capable of communicating with every other one of said plurality of system components, wherein at least two of said plurality of system components are indirectly coupled through a third system component such that signals transmitted by one of said at least two system components are received by said third system component over one of said plurality of unidirectional transmission rings and wherein signals are retransmitted by said third system component over another one of said plurality of unidirectional transmission rings for receipt by the other one of said at least two system components.

2. The data processing system recited in claim 1 wherein each of said plurality of system components comprises a pair of interface ports, a first one of said pair of interface ports being coupled to a first one of said plurality of unidirectional transmission rings and a second one of said pair of interface ports being coupled to a second one of said plurality of unidirectional transmission rings, wherein each of said plurality of system components is coupled to a different pair of said plurality of unidirectional transmission rings.

3. The data processing system recited in claim 2 wherein each one of said plurality of system components comprises:

a processor;

a plurality of interface circuits connected to said pair of interface ports; and a bridge interconnecting said pair of interface ports.

4. The data processing system recited in claim 3 wherein each one of said plurality of system components comprises four interface circuits, each one connected to one of said pair of interface ports.

5. A data processing system comprising:

a plurality of system components, each one having a pair of interface ports and a bridge interconnecting said pair of interface ports; and a plurality of unidirectional transmission rings interconnecting said plurality of system components, each one of said plurality of system components being connected to at least two of said plurality of unidirectional transmission rings, wherein a first one of said pair of interface ports is connected to a first one of said at least two unidirectional transmission rings and a second one of said pair of interface ports is connected to a second one of said at least two unidirectional transmission rings such that signals transmitted over one of said at least two unidirectional transmission rings and received by said first one of said pair of interface ports are coupled to said second one of said pair of interface ports through said bridge for retransmission by said second one of said pair of interface ports over said second one of said at least two unidirectional transmission rings.

6. A data processing system comprising:

a plurality of system components; and a plurality of unidirectional transmission rings interconnecting said plurality of system components, each of said plurality of system components being capable of communicating with every other one of said plurality of system components, wherein each of said plurality of system components is connected to a different set of at least two of said plurality of unidirectional transmission rings.

7. The data processing system recited in claim 6 wherein each of said plurality of system components has a pair of interface ports, a first one of said interface ports being connected to a first one of said unidirectional transmission rings of said set and a second one of said interface ports being connected to a second one of said unidirectional transmission rings of said set, wherein each of said plurality of system components further includes a bridge for interconnecting said pair of interface ports.

8. A data processing system comprising:

a plurality of system components, each one having a pair of interface ports and a bridge interconnecting said pair of interface ports; and a plurality of unidirectional transmission rings interconnecting said plurality of system components, each of said plurality of unidirectional transmission rings being connected to one of said pair of interface ports of at least two of said plurality of system components, and wherein each of said plurality of system components is coupled to a different set of at least two of said plurality of unidirectional transmission rings, a first one of said pair of interface ports being connected to a first one of said at least two unidirectional transmission rings and a second one of said pair of interface ports being connected to a second one of said at least two unidirectional transmission rings such that signals transmitted over one of said at least two unidirectional transmission rings and received by said first one of said pair of interface ports are coupled to said second one of said pair of interface ports through said bridge for retransmission by said second one of said pair of interface ports over said second one of said at least two unidirectional transmission rings.

9. A data processing system comprising:

a plurality of system components, each one having a pair of interface ports, at least one of said system components comprising:

(a) a processor; and (b) a pair of interface circuits, each one coupled to a corresponding one of said pair of interface ports and to said processor; and a plurality of unidirectional transmission rings interconnecting said plurality of system components, each of said plurality of system components being capable of communication with every other one of said plurality of system components so that a fault associated with one of said plurality of system components does not isolate any other one of said plurality of system components.

10. The data processing system recited in claim 9 wherein each one of said plurality of system components comprises four interface circuits, each one connected to one of said pair of interface ports.

11. A data processing system comprising:
a plurality of system components, each one having a pair of interface ports, at least one of said components comprising:
(a) a processor; and
(b) a pair of interface circuits, each one coupled to a corresponding one of said pair of interface ports and to said processor; and
a plurality of unidirectional transmission rings interconnecting said plurality of system components, wherein each of said system components is connected to a different set of said plurality of unidirectional transmission rings.

12. A data storage subsystem for controlling the transfer of data to data storage devices comprising:
a plurality of disk controllers, each of said disk controllers adapted for controlling data transmission between at least one of said data storage devices and the respective disk controller; and
a plurality of unidirectional data communication rings, each of said plurality disk controllers being interfaced to at least two of said plurality of unidirectional data communication rings to permit communication with another of said plurality of disk controllers, wherein each of said plurality of disk controllers is interfaced to a different at least two of said plurality of unidirectional data communication rings.

13. The data storage subsystem recited in claim 12 wherein each of said plurality of disk controllers comprises a pair of interface ports, a first one of said pair of interface ports being coupled to a first one of said at least two unidirectional data communication rings and a second one of said pair of interface ports being coupled to a second one of said at least two unidirectional data communication rings.

14. The data storage subsystem recited in claim 13 wherein each of said plurality of disk controllers comprises:
a processor; and
a bridge interconnecting said pair of interface ports such that signals transmitted over one of said at least two unidirectional data communication rings and received by said first one of said pair of interface ports are coupled to said second one of said pair of interface ports through said bridge for retransmission by said second one of said pair of interface ports over said second one of said at least two unidirectional data communication rings.

15. The data storage subsystem recited in claim 14 wherein each of said plurality of disk controllers comprises four interface circuits, each one connected to one of said pair of interface ports.

16. The data storage subsystem recited in claim 15 wherein said each one of said interface circuits is a interface circuit.

17. A storage server for controlling access to data storage devices comprising:

a plurality of disk controllers, each of said disk controllers adapted for controlling data transmission between at least one of said data storage devices and the respective disk controller; and
a plurality of unidirectional data communication rings, each of said plurality of disk controllers being interfaced to at least two of said plurality of unidirectional data communication rings, each of said plurality of disk controllers being capable of receiving data transmitted by a first other controller of said plurality of disk controllers over one of said at least two unidirectional data communication rings and forwarding said received data to a second other controller of said plurality of disk controllers over another one of said at least two unidirectional data communication rings.

18. The storage server recited in claim 17 wherein each one of said plurality of disk controllers is coupled to a different at least two of said plurality of unidirectional data communication rings.

19. The storage server recited in claim 18 wherein each one of said plurality of disk controllers comprises:
a processor;
a pair of interface ports, a first one of said pair of interface ports being coupled to a first one of said at least two unidirectional data communication rings and a second one of said pair of interface ports being coupled to a second one of said at least two unidirectional data communication rings; and
a bridge interconnecting said pair of interface ports such that signals transmitted over one of said at least two unidirectional data communication rings and received by said first one of said pair of interface ports are coupled to said second one of said pair of interface ports through said bridge for retransmission by said second one of said pair of interface ports over said second one of said at least two unidirectional data communication rings.

20. The storage server recited in claim 19 further comprising a plurality of interface circuits connected to said pair of interface ports, wherein each of said plurality of interface circuits is a interface circuit.

21. A computer network comprising:
at least one computer;
a plurality of data storage devices; and
a storage server for controlling access of said at least one computer to said plurality of data storage devices, said storage server comprising:
a plurality of disk controllers, each of said disk controllers adapted for controlling data transmission between at least one of said data storage devices and the respective disk controller; and
a plurality of unidirectional data communication rings, each of said plurality of disk controllers being interfaced to at least two of said plurality of unidirectional data communication rings to permit communication with another of said plurality of disk controllers, wherein each of said plurality of disk controllers is interfaced to a different at least two of said plurality of unidirectional data communication rings.

22. The data processing system recited in claim 1 wherein each of said plurality of unidirectional transmission rings is interconnected to the same number of said plurality of system components.

23. The data processing system recited in claim 1 wherein at least two of said plurality of unidirectional transmission rings are interconnected to different numbers of said plurality of system components.

24. The data processing system recited in claim 1 wherein each of said plurality of unidirectional transmission rings includes a plurality of segments for unidirectional transmission thereon, each of said segments having an input end coupled to one of said plurality of system components and an output end coupled to another one of said plurality of system components to form a data transmission ring.

25. The computer network recited in claim 21 wherein each of said plurality of unidirectional data communication rings includes a plurality of segments for unidirectional transmission thereon, each of said segments having an input end coupled to one of said plurality of data storage devices and an output end coupled to another one of said plurality data storage devices to form a data transmission ring.

* * * * *